United States Patent [19]

Fuse et al.

[11] Patent Number: 5,440,084
[45] Date of Patent: Aug. 8, 1995

[54] SHOCK DETECTING SYSTEM

[75] Inventors: Akira Fuse; Yuji Tsuda; Tsutomu Nakada, all of Yokohama, Japan

[73] Assignee: Nippon Aleph Corporation, Yokohama, Japan

[21] Appl. No.: 178,528

[22] Filed: Jan. 7, 1994

[30] Foreign Application Priority Data

Jan. 8, 1993 [JP] Japan .............................. 5-002596 U
Oct. 20, 1993 [JP] Japan .............................. 5-056670 U

[51] Int. Cl.⁶ ............................................ H01H 35/14
[52] U.S. Cl. ...................... 200/61.45 R; 200/61.45 M; 200/61.53; 335/205
[58] Field of Search ................. 200/61.45 R, 61.45 M, 200/61.47–61.53; 335/205–207

[56] References Cited

U.S. PATENT DOCUMENTS

| | | | |
|---|---|---|---|
| 3,622,926 | 11/1971 | Risk | 335/205 |
| 3,795,780 | 3/1974 | Lawrie | 200/61.45 R |
| 4,705,922 | 11/1987 | Seeger et al. | 200/61.45 M |
| 4,877,927 | 10/1989 | Reneau | 200/61.45 M |
| 4,980,526 | 12/1990 | Reneau | 200/61.45 M |
| 4,987,276 | 1/1991 | Bader et al. | 200/61.45 R |
| 5,212,357 | 5/1993 | Reneau | 200/61.45 M |
| 5,283,402 | 2/1994 | Green | 200/61.45 R |

FOREIGN PATENT DOCUMENTS 50-141044 12/1975 Japan .
2-203276 8/1990 Japan .
4-49868 4/1992 Japan .

*Primary Examiner*—J. R. Scott
*Attorney, Agent, or Firm*—Staas & Halsey

[57] ABSTRACT

A shock sensor including a switch turned on by magnetic force. The switch includes a reed switch, a magnet sliding back and forth along a case for the reed switch, and a coil spring biasing the magnet in a particular direction. When the sensor receives a shock, the biased magnet moves along the switch case, the magnetic force applied to the reed switch increases and when this magnetic force exceeds a predetermined amount, contact portions of the reed switch are closed and the switch is in the on state. Further, a weight forming an integral part of the magnet is used to increase the kinetic energy of the magnet or, between the coil spring and the switch case, there is a slack which enables movement of the coil spring in the direction of its diameter, either structure allowing the magnet to stay in the on state longer than a conventional switch.

18 Claims, 5 Drawing Sheets

SHOCK DETECTING SYSTEM

BACKGROUND OF INVENTION

1. Field of Invention

This invention relates to a sensor for detecting shocks (hereinafter referred to as "shock sensor"), in particular, this shock sensor detects varying accelerations of vehicles, such as motor cars, in, for example, the situations of car collisions, sudden stops, sudden starts or sudden accelerations, and detects car collisions and other vehicle situations. In particular, this shock sensor has a magnetic reed switch, which detects shocks that vehicles receive at the time of vehicle collisions and other traffic accidents, and outputs the signal to actuate a protective device, such as an air bag or seat belt system.

2. Prior Art

In the prior art, there are many examples of shock sensors using a magnetic reed switch. These shock sensors have a housing mounted within the car, wherein the switch case is placed in the direction in which a shock is to be detected, for example, in the direction in which the motor car moves. In the switch case, the magnetic reed switch is held, and a magnet of cylindrical shape is held and placed coaxially with the switch case. The magnet is biased by a coil spring so that it may slide along the switch case.

When a motor car stops suddenly due to a car collision or other cause, the shock sensor receives the rather significant deceleration, and as a result, the magnet in the shock sensor, based on its inertial mass, under the inertial force, moves along the switch case against the resistance of the bias of the coil spring.

When the magnetic force applied to the contact portion of the magnetic reed switch exceeds a predetermined figure, the contact portions are closed causing the switch to be in the on state Afterward, as the motor car stops, the tension of the spring becomes greater than the inertial force of the magnet, and the magnet moves to the opposite direction along the outer surface of the switch case, back to its original position prior to the collision. At this time, the magnetic force applied to the magnetic reed switch gradually decreases, and the contact portions of the switch are converted to the off state, when the magnetic force decreases to a level below the predetermined figure.

The magnetic reed switch remains in the on state from the time the contact portions are closed until the time when the contact portions are opened. The on state of the contact portions is detected by a predetermined detecting circuit, and the signal from the detecting circuit is entered into the controller for the passenger protection safety system, such as air bags.

However, when the shock applied to the conventional shock sensor is extremely great, the speed of the magnet moving along the outer surface of the switch case increases, and, as a result, the on state of the magnetic reed switch ends after a very short time, and it is possible that the shock detecting signal from the detecting circuit would also be output for a very short time.

Moreover, in a conventional shock sensor, the distortion of the coil spring in the direction of its diameter is restricted such that it only occurs when the coil spring is compressed very strongly, causing a problem in that the period during which the magnetic reed switch continues to be in the on state varies, case by case.

When assembling the conventional shock sensor, the coil spring may be put between the housing and the switch case, and resin used to seal the reed switch may adhere to the coil spring placed between the housing and the switch case. This may prevent expansion and contraction movements of the coil spring, and thus may cause malfunctions of the shock detecting system.

SUMMARY OF INVENTION

An objective of the present invention is to provide a shock sensor which is capable of securely detecting a shock even in the event that the shock felt by the sensor is major. Another objective of the present invention is to provide a shock sensor wherein the time period during which the magnetic reed switch continues to be in the on state is constant. A further objective of the present invention is to provide a shock sensor which may achieve the objectives mentioned above using a simple structure. A further objective of the present invention is to provide a shock sensor wherein there is no risk of the coil spring being entangled inside when assembling the components of the shock sensor. A further objective of the present invention is to provide a shock sensor for the reliable operation of the protective devices, such as air bags. A further objective of the present invention is to provide an operating system for protective devices comprising the shock sensor.

The sensor for detecting shocks of the present invention includes a switching member turned on by the influence of a magnetic force, and a movable member having a magnet which moves along the switch under the inertial force applied as a result of an application of the shocks. The movable member is placed to move in the direction in which it is intended that the shocks will be detected. Moreover, the sensor for detecting shocks includes an extension means for extending the period that the movable member remains at the location in which the switching member is kept in the on state when the shocks are applied to the movable member.

One example of such an extension means is a weight member attached to the movable member in order to increase the specific gravity of the movable member. This weight member consists of a material having a specific gravity greater than that of the material of the magnet. The magnet is made of a magnetic plastic.

In order to enable such extension, the coil spring, an elastic member which biases the movable member in a particular direction such as in the direction of the shocks, may also deform in the direction of its diameter as well as in its longitudinal direction. In order to enable such deformation, a slack is provided between the coil spring and the switching member so that the coil spring may deform in the direction of its diameter. A larger diameter of the coil spring is preferred.

The movable member has a part with a smaller diameter than other parts, and the smaller diameter part is inserted within the coil spring. The length of the smaller diameter portion is preferably shorter than the length of the coil spring when compressed completely.

The switching member is turned on by an application of shocks felt as a result of a vehicle collision. This shock sensor is connected to a detecting circuit for the detection of the on state of the switch.

Also, the switch is contained in, for example, a glass case. The elastic member is placed between the case and the movable member. The end portion of the elastic member is supported, for example, by a recess formed on the case. One example of the switching member is a magnetic reed switch. It is acceptable if the movable member includes solely magnets.

Moreover, the present invention relates to a safety system to secure the safety of passengers when vehicles receive shocks. This system outputs a detection signal detected by the shock sensor to passenger protective devices, such as air bags. As a result, the shock sensor securely operates the passenger protective device when a vehicle is involved in an accident such as collision.

This shock sensor is reliable in detecting shocks even when a shock applied to a vehicle is major. Moreover, the shock sensor detects shocks in a manner such that the period during which the switching member is kept in the on state is constant. Furthermore, the sensor detects shocks using a simple structure.

DETAILED DESCRIPTION OF PREFERRED EMBODIMENTS

The preferable embodiments of the present invention are hereinafter described.

Figure 1:
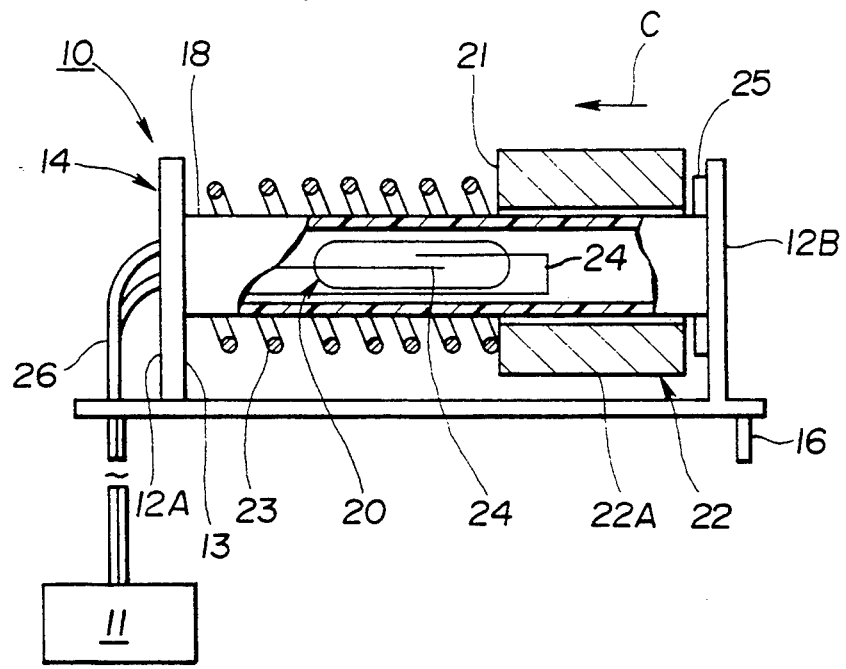
FIG. 1 illustrates the basic structure of a shock sensor, and a part of which is cross sectional.

FIG. 1 illustrates the basic structure of a shock sensor. Shock sensor 10 has a housing 14 mounted within a car. Attachment parts 16, provided to form an integral part of the housing 14, attach the housing 14 to the body of a vehicle, such as a motor car.

Within a space between walls 12A and 12B, provided in a longitudinal direction of the housing 14, a switch case 18, e.g., tube member 18A is inserted and held, whose longitudinal direction is located in the direction in which a shock will be detected, for example, in the direction in which the motor car moves forward. The inside of the tube member 18A is formed as a hollow cylindrical shape. In an area within the tube member 18A shown on the left hand side of FIG. 1, a magnetic reed switch 20 is inserted and held, and around the tube member 18A, a movable member 22, e.g. of a magnet 22A of cylindrical shape, is placed. This magnet 22A is held and placed coaxially with the tube member 18A. This magnet 22A may move back and forth around and along tube member 18A in its longitudinal direction. The movable member 22 is to be placed to move along the direction in which it is intended that the shocks will be detected. The numeral 23 indicates a coil spring placed and held between one end surface 21 of the magnet 22A, adjacent to the switch 20, and an end surface 13 of the housing 14, facing thereto. The coil spring 23 biases the magnet 22A away from the switch 20 (right hand direction in FIG. 1).

Each of two connection terminals 24 in the reed switch 20 is connected to a lead 26 in order to output the closure of the connection terminals 24 to the detecting circuit 11. Although the movable member 22 is shown as a magnet 22A, it may also be another circular member to which the magnet is attached. The numeral 25 indicates a stopper to restrict the movement of the end portion of the magnet 22A opposite to the coil spring 23.

Figure 2:
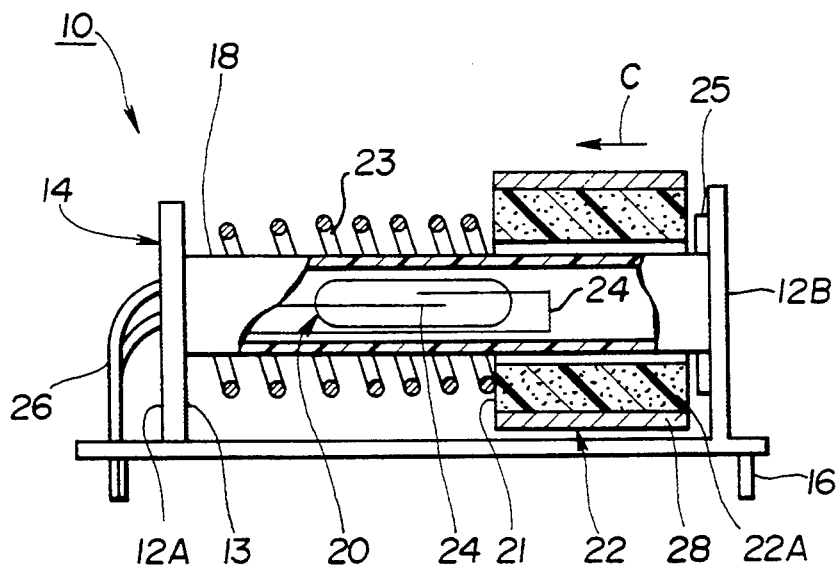
FIG. 2 illustrates the structure of the first embodiment of a shock sensor according to the present invention, and a part of which is cross sectional.

FIG. 2 illustrates the structure of a first embodiment of the shock sensor according to the present invention. The embodiment shown in FIG. 2 is different from the basic structure shown in FIG. 1 in that weighted member 28 of cylindrical shape, having a material which has heavier specific gravity than that used for magnet 22A, is attached as an integral part of the magnet. In other words, the weighted member 28 has a circular cavity in its center portion, so that the magnet 22A may be closely inserted into the cavity of the weighted member 28. Thereby, the weighted member 28 forms an integral part of the magnet 22A.

Next, the operation of the preferable embodiment is explained. When a motor car is stopped or is engaged in its normal operations, such as being driven at a constant or at varying speeds, as there is no significant acceleration or deceleration applied to the shock sensor, magnet 22A along with the weighted member 28 are biased toward contacting the stopper 25, disposed on the right edge of tube member 18A due to the tension of the spring 23. Therefore, the magnetic force does not apply to magnetic reed switch 20 because the magnet is distant from the switch, and thus the contact portions 24 of the magnetic reed switch 20 are open, which is the "off" state of the switch 20.

From such a state, when a motor car or other vehicle receives a shock, in a direction facing the direction to which vehicle moves (i.e., the right hand direction in the FIG. 2), due to a collision, etc., and suddenly stops, shock sensor 10, as shown by Arrow C, receives a significant deceleration in the right hand direction shown in FIG. 2 from the moment of receiving the shock.

The movable member 22 moves in the left hand direction of tube member 18A, in which the vehicle is moving forward, receiving the inertial force which is caused by the inertial mass of the magnet 22A and weight member 28. At this moment, magnet 22A slides around and along the outer surface of the tube member 18A to the end adjacent to the switch 20, against the tension of the spring 23 which biases the movable member 22 in the direction of shock, and stops when it reaches the point where the spring is completely compressed. Then, the magnetic force applied to contact portions 24 of the magnetic reed switch 20 gradually increases, and when it exceeds a predetermined figure, the contact portions 24 are closed causing the switch 20 to be in the on state.

When the motor car stops and the acceleration applied to the movable member 22 falls below a predetermined value, the magnet is no longer capable of resisting the tension of the spring, and moves in the opposite direction along the outer surface of tube portion 18A toward its position prior to the collision. Due to this process, the magnetic force applied to the contact portions 24 of the magnetic reed switch 20 gradually decreases, and when the magnetic force fall below a predetermined figure, the contact portions 24 are opened causing the switch 20 to be converted from the "on" state back to the "off" state.

Since the weighted member 28 is attached to the magnet 22A, forming an integral portion thereof, the inertial mass of the movable member 22 having the magnet and the weighted member 28 increases. In other words, the kinetic energy of the movable member 22 is increased after the complete compression of the spring. This increased kinetic energy is transformed to cause a deformation of the case or spring, or vibrational energy thereof, and then its energy is reconverted back into kinetic energy of the movable member.

At this point, the deformation or vibration of the members increases as the kinetic energy of the movable member increases, and thus more time is required to convert the energy, i.e., to transfer the energy, and the part of the energy which is exhausted in the course of the conversion, depending on the efficiency of the energy conversion. In other words, more time is required to change the direction of the velocity of the movable member, and also the velocity of the movable member decreases after the direction change occurs, and the magnet will tend to remain in the position where the contact portion of the reed switch 20 is in the "on" state, in other words, tending to extend the period of time where the contact portion 24 is in the closed position. The period from the time when the magnet starts to move to the time when the magnet returns to its original position prior to receiving the shocks due to the collisions is extended because it takes more time to convert the energy, i.e. to transfer the energy, and the energy which is exhausted during such conversion, as stated above.

As a result, the reed switch 20 remains in the "on" state for a longer period, thus ensuring the detection of the "on" state of the switch by the detecting circuit. As a result, the controller which controls protective devices, such as air bags, will recognize with certainty, through the longer detection signal output, that the vehicle has experienced a shock. Accordingly, the controller will be able to securely operate air bags or devices for tightening seat belts.

To the contrary, if the weighted member was not attached to the movable member, the kinetic energy of the movable member might be smaller, and the reed switch would be kept in the "on" state for a shorter period. It is likely in this case that the controller might not recognize the detection signal because the signal from the detecting circuit is output only during the shorter period.

The magnet 22A consists of, for example, magnetic plastic material. This magnet is set within the space provided inside the weighted member 28, consisting of metal, etc., and whose specific gravity is greater than that of the magnetic plastic material. This weighted member may be selected from materials either magnetic or non-magnetic. Preferably, the weight of the weighted member shall be determined within the range where the reed switch remains in the "on" state during the desired period, in particular within the range where the movable member does not lose kinetic energy even when the coil spring is completely compressed.

Even if the magnet consists of a light material, such as a plastic, the weight of the movable member may be increased by using the weighted member.

The shock sensor illustrated in this embodiment has such a simple structure that the magnet is inserted into the space provided within the weight member, and thus it may be manufactured rather inexpensively.

Figure 3:
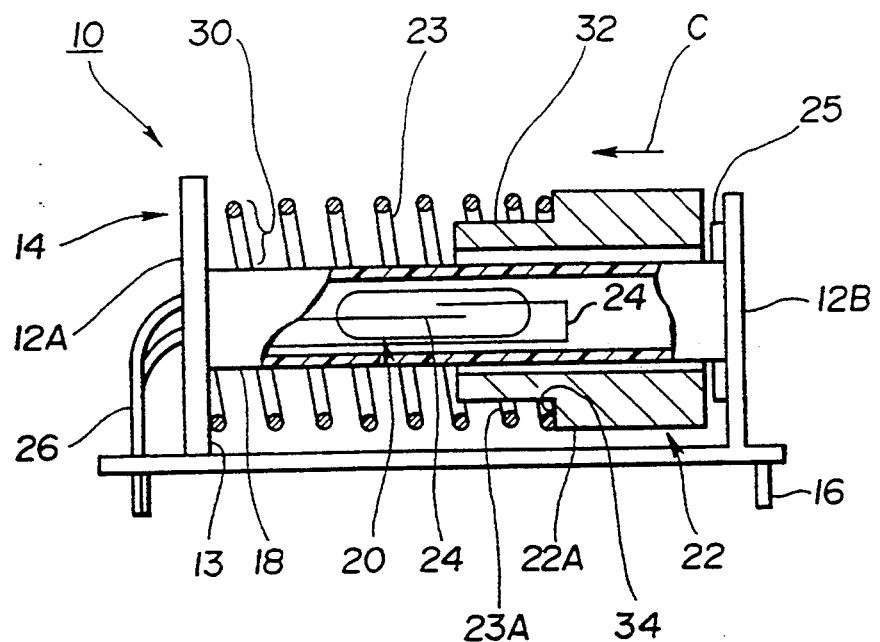
FIG. 3 illustrates the structure of the second embodiment of a shock sensor according to the present invention, and a part of which is cross sectional.

Next, the second embodiment of the present invention is explained. FIG. 3 illustrates the structure of this embodiment, and is different from the embodiment illustrated in FIG. 2 in the following points: First, the diameter of the coil spring 23 is expanded to approximately twice the size as the diameter of the switch case (equivalent to the tube portion 18A) 18, and forms a slack 30 between the coil spring 23 and the switch case 18 inserted within the coil spring; Second, at the portion of the magnet 22A adjacent to the reed switch 20, approximately one half length of the entire magnet, has a smaller exterior diameter than that of the remaining portion, and an end portion 23A of the coil spring 23 opposite the wall 12A is disposed around this smaller diameter portion 32 so that this end of the coil spring contacts an end surface 34 at a base portion of the smaller diameter portion 32.

Figure 4:
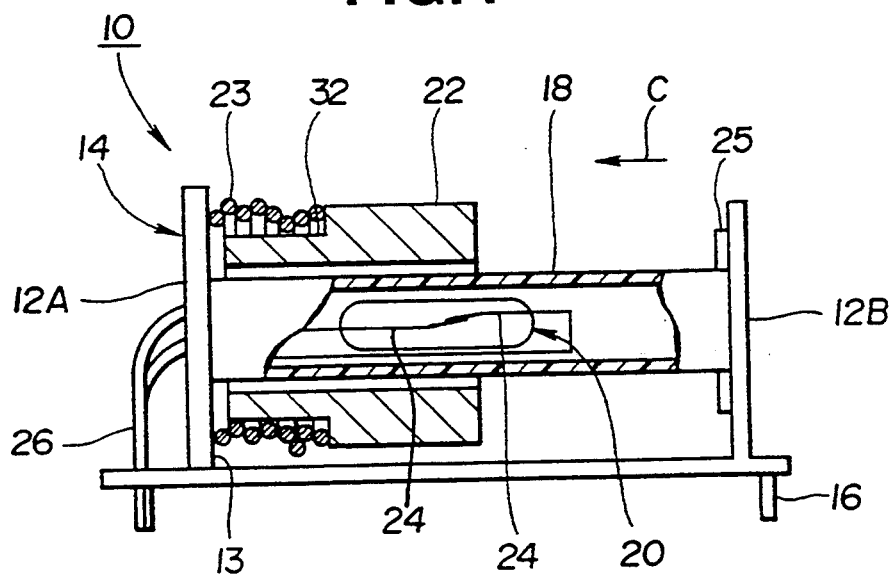
FIG. 4 illustrates a shock sensor in FIG. 3 in the state where the coil spring is completely compressed.

In this shock sensor, when a vehicle receives a shock due to a collision, etc., the magnet 22A in the shock sensor slides along the outer surface of switch case 18, resisting the tension of the coil spring, and completely compresses the coil spring. Moreover, because of the slack space 30 between the coil spring 23 and the tube portion 18A the coil spring 23 may also easily deform in the direction of its diameter, in other words the coil spring may deform with wavering movements as shown in FIG. 4. The movable member 22 containing the magnet 22A stops when the deformation is complete.

As a result, the energy of the movable member 22 is converted into a deformation of coil spring 23 in its longitudinal and diametrical direction, or into a vibration of the spring, and then this deformation is converted back into the kinetic energy of the movable member. Therefore, it takes more time for the movable member to change its direction, and return to its original position, and the acceleration applied to the movable member decreases based on the loss from the conversion of energy, from the deformation of the spring in the direction of its diameter, to the kinetic energy of the movable member. As the spring deforms to its diametrical direction, the deformation and vibration of the material increases. Also, if the spring is deformed to its diametrical direction, the magnet is also biased in a diametrical direction, when it returns from its compressed state to its original elongated state. This means that the magnet is pushed against the wall surface of tube member 18A. Due to this process, kinetic energy of the magnet is lessened, and it takes more time for the magnet to return to its original position.

Consequently, the period of time during which the magnet reed switch remains in the "on" state may be extended. In the shock sensor in FIG. 3, the period during which the magnet reed switch remains in the "on" state may be more extended by attaching the weighted member 28 to the magnet as explained in FIG. 2.

Figure 5:
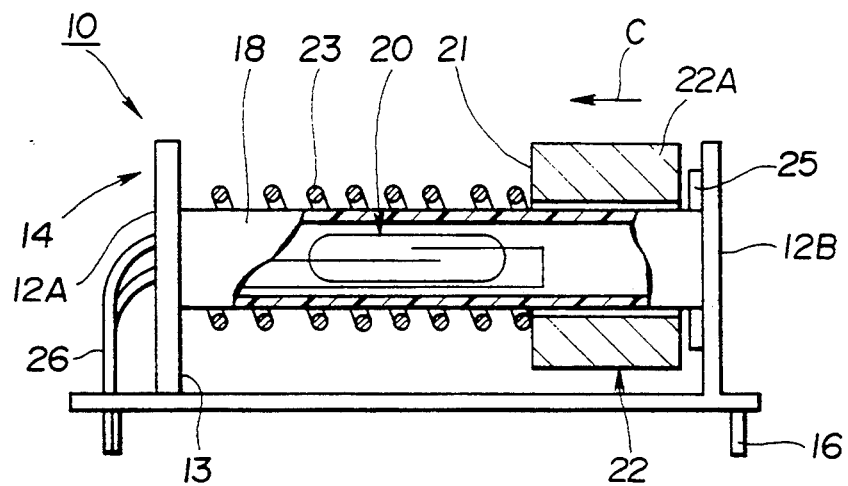
FIG. 5 illustrates a structure of a shock sensor without slack between a coil spring and a case, and a part of which is cross sectional.

To the contrary, in the shock sensor depicted in FIG. 5, the deformation of the coil spring towards its diametrical direction is restricted, since there is very little slack between coil spring 23 and tube portion 18A. In the shock sensor in FIG. 1, the coil spring deforms towards its diametrical direction only when the shock sensor experiences an extremely strong shock, and the period during which the switch remains in the "on" state varies in each case. In the shock sensor according to FIG. 3, if the kinetic energy of the movable member is larger than the kinetic energy necessary for completely compressing the coil spring, the period during which the switch remains in the "on" state is constant because the coil spring deforms towards its diametrical direction.

Preferably, the length of the smaller diameter portion 32 of the magnet will be shorter than the length of the coil spring when it is completely compressed. With this length, when magnet 22A receives a shock and moves toward the left, as shown in FIG 4, compressing the coil spring, the end 21 of the magnet 22A is prevented from making contact with end surface 13 of housing 14 even when the coil spring is completely compressed, and the shock, i.e., the kinetic energy of the magnet is converted into the compression of the coil spring, the deformation towards the diameter, and the vibration of the coil spring. Since the shock sensor has a simple enough structure that the shape of the magnet used in the conventional shock sensor may be changed, and a coil spring with a larger diameter may be used, this enables the production of a sensor which detects with certainty shocks at rather low costs.

The coil spring 23 is supported between movable member 22 and end surface 13 of housing 14 by smaller diameter portion 32, which is inserted into the coil spring 23 and end surface 34 to which the end portion of the coil spring makes contact, so that the coil spring does not come off from the movable member 22.

Figure 6:
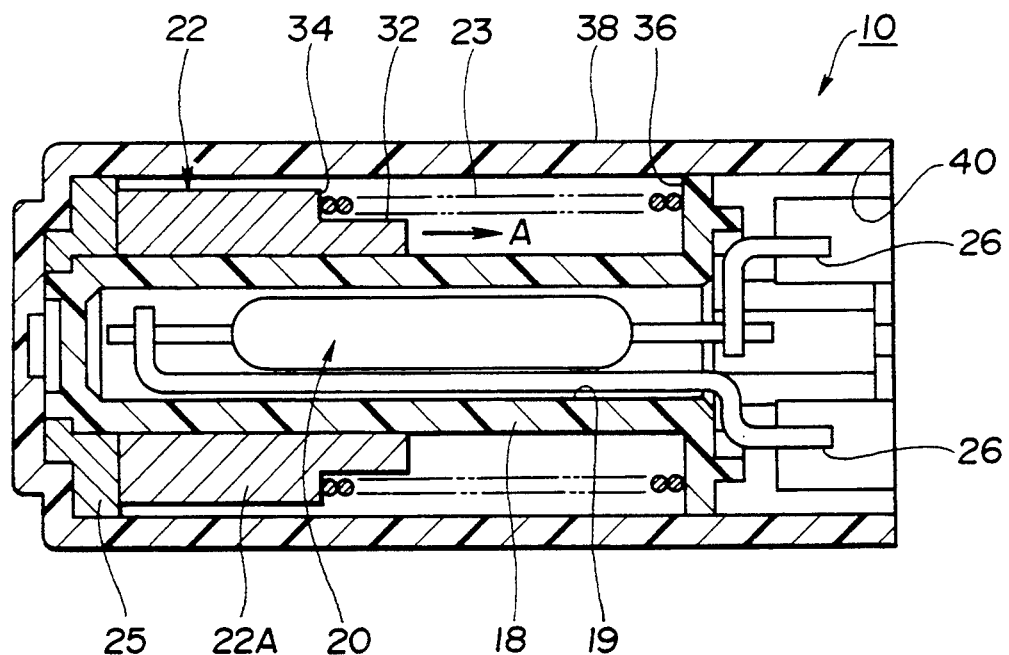
FIG. 6 illustrates a detailed structure of the shock sensor of FIG. 2 and more particularly, a cross section of a shock sensor cut along the longitudinal direction to the direction perpendicular to gravity.
Figure 7:
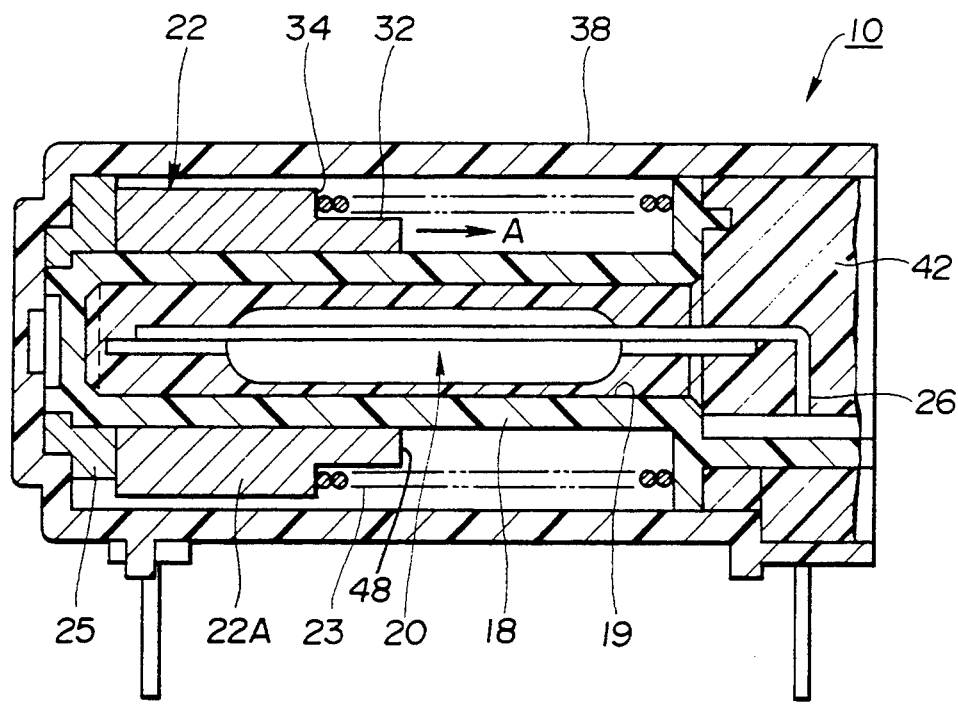
FIG. 7 illustrates a structure of a shock sensor of FIG. 6 which is sealed with a resin and, more particularly, a cross section of a shock sensor cut along the longitudinal direction to the direction of gravity.

FIGS. 6 and 7 illustrate in more detail the shock sensor shown in FIG. 3. The shock sensor shown in FIG. 6 is assembled by the following steps. Magnetic reed switch 20 is inserted in a space 19 provided within switch case 18 equivalent to the tube portion and is secured therein. The magnet is placed around the switch case. Coil spring 23 is disposed between end surface 34 of smaller diameter portion 32 of the magnet and an end surface 36 projected from the switch case in a flange shape toward its diameter.

Then, the switch case 18, magnet 22A and coil spring 23 are jointly secured by using stopper 25. The switch case, magnet and coil spring so secured are then inserted into housing 38 from an opening 40 therein on the right side, and then this opening of the case is sealed by using thermosetting resin 42. At this point the assembly of the shock sensor is completed.

Figure 8:
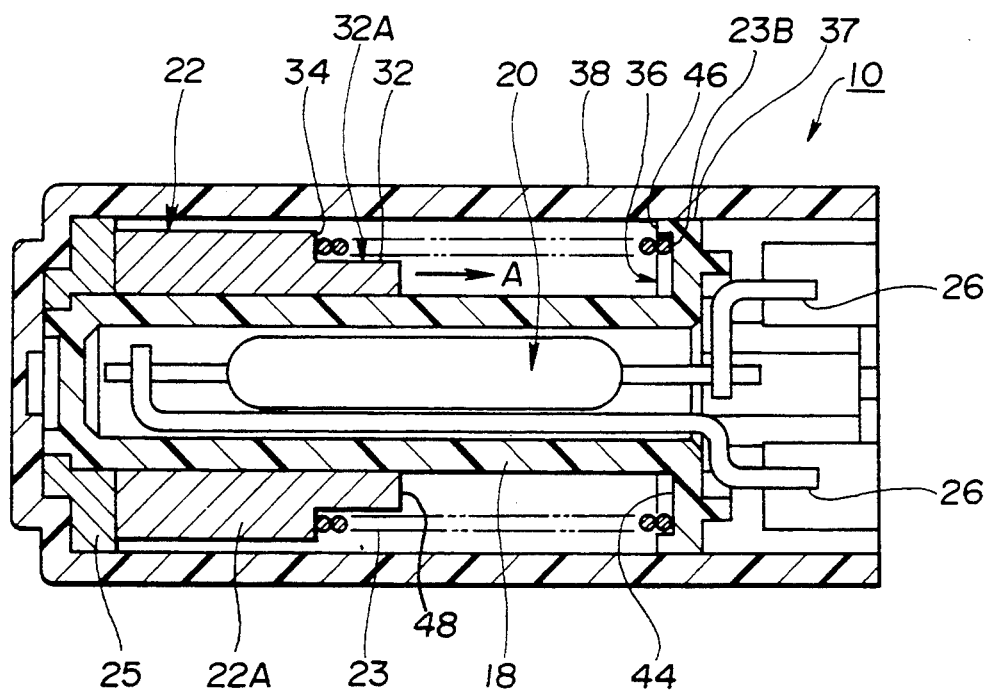
FIG. 8 corresponds to FIG. 6 for the third embodiment of a shock sensor.
Figure 9:
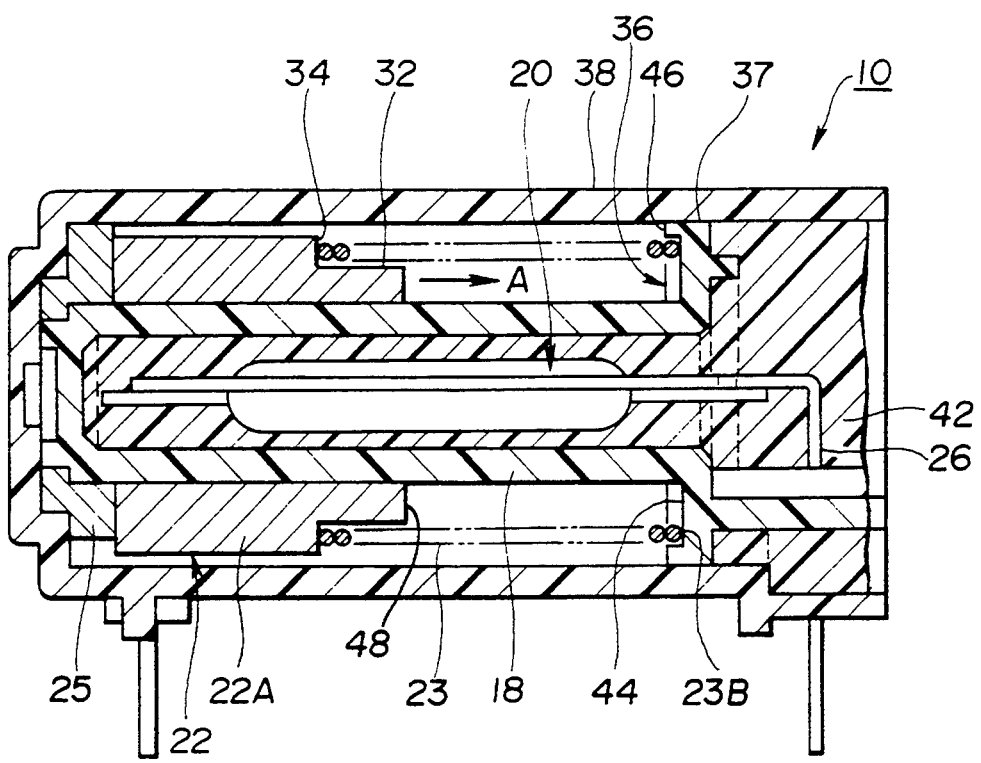
FIG. 9 corresponds to FIG. 7 for the third embodiment of a shock sensor.

FIG. 7 illustrates the completely assembled shock sensor. In such a shock sensor, a part of the coil spring is put between switch case 18 and housing 38 when switch case 18 is inserted into housing 38. This may cause adhesion of the thermosetting resin to the magnet or coil spring as the resin penetrates housing 38 through the space created between the outer surface of the switch case to which the coil spring sticks, and the inner surface of the housing. If the resin which has adhered to the magnet, etc., hardens, the movement of the magnet or expansion and contraction or deformation of the coil spring may be restricted, and fluctuations or malfunctions in the performance characteristics of the shock sensor may occur. FIGS. 8 and 9 illustrate a shock sensor that solves such problems.

FIGS. 8 and 9 illustrate the shock sensor according to the third embodiment in the present invention. In this shock sensor, circular groove 44 with a fixed width is formed in the diametrical direction of the switch case 18 on the end surface 36 of the switch case facing the coil spring 23. This circular groove 44 is formed adjacent to the center of the switch case, and a circular projection 46 is formed on the periphery of the circular end surface. End portion 23B on the side of the relevant end surface of the coil spring is engaged within the circular groove 44, and circular projection 46 prevents the top portion of the coil spring from moving toward the outer side in the direction of its diameter. In other words, end portion 23B of coil spring 23 is embraced by the circular projection 46 from the outside of the spring in the direction of its diameter.

Therefore, when inserting the switch case into housing 38, a portion of the coil spring, for example, its top end, is prevented from being put between, for example, side surface 37 of the end surface 36 of the switch case 18 and the inner surface of the housing 38. As a result, the thermosetting resin is prevented from penetrating between the switch case and housing, and the shock sensor will operate with certainty and with the desired characteristics.

The coil spring may then be secured at the right position within housing 14. Also, the coil spring, magnet, and magnetic reed switch will be sheltered from the outside, and thus isolated from corrosive substance in the atmosphere.

Projection 46 is formed within the space around the smaller diameter portion 32 so that end portion 48 of the magnet does not smash against this projection. Therefore, the stroke of the movement A of magnet 22A will not be shortened because of the existence of the projection.

The aforementioned embodiments are explained for the illustrative purposes and the present invention shall not be limited to the aforementioned embodiments.

What is claimed is:

1. A sensor for detecting shocks, comprising:
   an elongated switch containing contacts that are closed by applying a magnetic force to put the switch in an on state and opened by removing the magnetic force to put the switch in an off state;
   a movable member having a magnet for applying the magnetic force, said movable member being movable along the longitudinal axis of the switch, between a first position at a first end of the switch corresponding to the off state, and a second position at a second opposite end of the switch corresponding to the on state, said movable member moving along said switch from the first position to the second position as a result of an application of a shock to the sensor in the longitudinal direction;
   an elastic member which normally biases said movable member into the first position; and
   means, connected to the moveable means, for increasing the kinetic energy of the movable member and prolonging the period that said movable member is in the on state.

2. A sensor according to claim 1, wherein said means for prolonging comprises a weight member attached to the movable member so that the specific gravity of the movable member is increased.

3. A sensor according to claim 2, wherein said weight member comprises a material having a specific gravity greater than the specific gravity of said magnet.

4. A sensor according to claim 3, wherein said magnet comprises a magnetic plastic.

5. A sensor according to claim 1, wherein said means for prolonging comprises the elastic member having a diameter and being capable of deforming in the direction of the diameter.

6. A sensor according to claim 5, wherein said elastic member comprises a coil spring placed around said switch, and a slack space is disposed between the coil spring and the switch so that the coil spring may deform in the direction of its diameter.

7. A sensor according to claim 1, wherein said elastic member comprises a coil spring, and said movable member has a portion which has a diameter smaller than the diameter of said spring, said smaller diameter portion receiving a portion of said coil spring.

8. A sensor according to claim 7, wherein said coil spring has a dramatic and is placed around said switch, and a slack space is provided between the coil spring and the switch so that the coil spring may deform in the direction of its diameter.

9. A sensor according to claim 7, wherein the length of said smaller diameter portion is shorter than the length of the coil spring when the coil spring is compressed completely.

10. A sensor according to claim 1, wherein the contacts of said switch are closed by a shock felt as a result of a vehicle collision.

11. A sensor according to claim 1 further comprising a detecting circuit which detects the on state of said switch.

12. A sensor according to claim 1, wherein said switch comprises a housing in which said switch is inserted, and
said elastic member is provided between said housing and said movable member;
wherein an end portion of said elastic member is supported by said housing.

13. A sensor according to claim 12, wherein said housing comprises a groove which receives an opposite end portion of the elastic member.

14. A sensor according to claim 13, wherein said elastic member comprises a coil spring and said movable member comprises a portion the diameter of which is smaller than the diameter of said spring, said smaller diameter portion receiving a portion of said coil spring.

15. A sensor according to claim 1, wherein said switch comprises a magnetic reed switch.

16. A passenger protection safety system applied to a vehicle, comprising:
a passenger protective device operating by the influence of a shock applied to the device;
a sensor for detecting said shock, said sensor including an elongated switch containing contacts that are closed by applying a magnetic force to put the switch in an on state and opened by removing the magnetic force to put the switch in an off state;
a movable member having a magnet for applying the magnetic force, said movable member being movable along the longitudinal axis of the switch, between a first position at a first end of the switch corresponding to the off state, and a second position at a second opposite end of the switch corresponding to the on state, said movable member moving along said switch from the first position to the second position as a result of an application of the shock to the sensor in the longitudinal direction;
an elastic member which normally biases said movable member into the first position; and
means, connected to the moveable means, for increasing the kinetic energy of the movable member and prolonging the period that said movable member is in the on state;
wherein the period that said movable member remains in the first position when the shock is applied to the vehicle is prolonged.

17. A protective system according to claim 16, wherein said movable member comprises a member whose specific gravity is greater than the specific gravity of said magnet.

18. A protective system according to claim 16, wherein said elastic member comprises a coil spring having a diameter and which is capable of deforming in the direction of the diameter.

* * * * *